United States Patent [19]
Harblin

[11] Patent Number: 6,110,536
[45] Date of Patent: Aug. 29, 2000

[54] METHOD OF MODIFYING EPOXY-COATED SHIP'S HULL SURFACES, AND SURFACES OBTAINED THEREBY

[75] Inventor: Owen Maynard Harblin, Clifton Park, N.Y.

[73] Assignee: General Electric Company, Schenectady, N.Y.

[21] Appl. No.: 09/216,773

[22] Filed: Dec. 21, 1998

[51] Int. Cl.⁷ .................................................. B05D 3/02
[52] U.S. Cl. ..................... 427/386; 427/387; 427/409; 427/410
[58] Field of Search ................................. 427/386, 387, 427/410, 409

[56] References Cited

U.S. PATENT DOCUMENTS

| | | | |
|---|---|---|---|
| 4,025,693 | 5/1977 | Milne | 106/15 R |
| 4,080,190 | 3/1978 | Law et al. | 71/67 |
| 4,227,929 | 10/1980 | Law et al. | 424/288 |
| 5,449,553 | 9/1995 | Griffith | 428/332 |
| 5,691,019 | 11/1997 | Carroll et al. | 428/40.1 |

FOREIGN PATENT DOCUMENTS

| | | |
|---|---|---|
| 496552 A1 | 7/1992 | European Pat. Off. . |
| 532273 A1 | 3/1993 | European Pat. Off. . |
| 881269 A2 | 2/1998 | European Pat. Off. . |
| 3-258876 | 11/1991 | Japan . |

OTHER PUBLICATIONS

Kohl et al, Proc. Annu. Meet. Adhes. Soc., 21 st, pp 135–137, 1998.

Burkus et al, Pitture Vernici Eur. 73 (15), pp 54–55, 57–59, 62–63, 66–67, 1997.

*Primary Examiner*—Erma Cameron
*Attorney, Agent, or Firm*—Bernadette M. Bennett; Donald Ingraham

[57] ABSTRACT

A method is provided for treating anti-corrosive steel surfaces, such an epoxy-coated ship's hull, in an environmentally improved manner, with an epoxy-silicone-adhesive paint, as a tiecoat, to provide for the subsequent application of silicone foul release coatings.

9 Claims, No Drawings

6,110,536

METHOD OF MODIFYING EPOXY-COATED SHIP'S HULL SURFACES, AND SURFACES OBTAINED THEREBY

STATEMENT REGARDING FEDERALLY SPONSORED RESEARCH & DEVELOPMENT

This invention was made with government support under Contract No. N00014-95-C-6024 awarded by the U.S. Government. The government has certain rights in this invention.

BACKGROUND OF THE INVENTION

The present invention relates to a method of treating an epoxy resin coated metallic substrate, such as a ship's hull, with an epoxy-silicone-adhesive paint as an intermediate tie-layer to effect the bonding of subsequently applied duplex silicone foul release coatings.

Metallic structures submerged in sea water, such as ship bottoms, are generally infested with organisms, such as barnacles, tube worms, and algae, which can become attached to the surface of these structures causing increased fuel consumption due to increased drag. Routinely, antifouling paints are used to treat the surface of these exposed substrates to minimize corrosion. Silicones have been known as effective anti-fouling coatings as early as the 1970's, as shown by U.S. Pat. Nos. 4,025,693, 4,080,190 and 4,227,929.

In Griffith, U.S. Pat. No. 5,449,553, which is incorporated herein by reference, a nontoxic anti-fouling system is described which involves the application of a silicone room temperature vulcanizable (RTV) condensation cure composition, for example, GE RTV 11, as a topcoat, which interfaces with sea water, and which is anchored onto a semi-cured organo-silicon condensation cure RTV bonding layer. An example of a semi-cured RTV condensation cure bonding layer is Silgan J-501 of the Wacker Silicones Corporation of Adrian, Mich., as shown in the aforesaid Griffith, U.S. Pat. No. 5,449,553. The semi-cured RTV condensation cure bonding layer is directly applied, and is in contact with the epoxy treated metallic substrate, such as a ship's hull, and can serve as an anchor for a subsequently applied silicone condensation cure RTV topcoat.

The combination of these condensation cure RTV's has been found to be effective as a duplex non-toxic silicone foul release system when properly secured to a ship's hull. The application of the duplex non-toxic silicone foul release system is preferably made under ambient conditions onto an epoxy-coated metallic substrate, for example a ship's hull, which has been thoroughly cleaned, sand blasted to metallic substrate, and then freshly coated with an epoxy resin.

Experience has shown that even though adhesion between the silicone room temperature vulcanizable (RTV) composition which interfaces with sea water, and the aforementioned silicone-organic bonding layer in the dual silicone foul release system is generally satisfactory, adhesion between the silicone bonding layer and the epoxy coating on the metallic substrate is often unsatisfactory.

A procedure which has been developed to improve adhesion between the silicone-bonding layer and the epoxy resin coating on a metallic substrate, such as a ship's hull, is based on the use of an equal parts mixture of butanol and a curable epoxy resin mixture, referred to sometimes as "epoxy mistcoat". In making the epoxy mistcoat, there is used in combination with butanol, an epoxy resin paint, which may contain Epon 828 resin and an amine curing catalyst for the epoxy resin, such as VERSAMID 140 of the Henkel Coporation of Ambler, Pa. As a result of applying the epoxy mistcoat directly onto the epoxy-coated ship's hull, a binary epoxy layer is formed prior to the application of the duplex non-toxic silicone foul release system. While an improvement in adhesion has been found to occur between the resulting binary epoxy layer, and the subsequently applied silicone-organic bonding layer, considerable environmental concerns have been recognized as a result of butanol emissions. In addition, special mixing procedures, and time restrictions have been found necessary to achieve satisfactory bonding between the epoxy mistcoat and the silicone-organic bonding layer.

Additional techniques are therefore needed to provide an environmentally safe and efficient method to satisfactorily anchor the duplex silicone foul release coating system onto an epoxy-coated ship's hull.

BRIEF SUMMARY OF THE INVENTION

The present invention is based on the discovery that an epoxy-silicone mixture, referred to hereinafter as the "epoxy-silicone-adhesive-paint", can be applied in an environmentally safe manner onto an epoxy-coated metallic substrate, such as a steel or aluminum ship's hull, to form an effective foundation coating to anchor the subsequently applied silicone-bonding layer, which thereafter can be further treated with a condensation cure silicone RTV foul release topcoat to form the duplex silicone foul release system as previously described.

The epoxy-silicone-adhesive-paint, comprises a blend of an epoxy paint, and an effective amount of a silicone adhesion promoter. The silicone adhesion promoter comprises a mixture of a hydrocarbon solvent, for example, mineral spirits, in combination with an RTV silicone condensation cure catalyst system, i.e. a partially condensed organosilicate, a uniformly dispersed, or solubilized metallic catalyst, such as dibutyl tin oxide, and an effective amount of an alkylaminotrialkoxysilane, such as γ-aminopropyltrimethoxysilane.

STATEMENT OF THE INVENTION

There is provided by the present invention, a method of modifying under atmospheric conditions, a metallic substrate coated with a cured epoxy resin to allow the subsequent application thereon of a duplex silicone foul release coating, which comprises the steps of, (a) applying onto the cured epoxy resin coated metallic substrate, an epoxy-silicone-adhesive paint comprising by weight, (i) 80–85% of an epoxy resin paint, and (ii) 15–20% by weight of a silicone adhesive promoter, comprising a volatile hydrocarbon solvent, a partially condensed organosilicate, a solubilized metallic catalyst, and an aminoalkyltrialkoxysilane, where the aminoalkyltrialkoxysilane is present in the silicone adhesive promoter in an amount which is at least sufficient to impart to the epoxy-silicone-adhesive paint upon cure to at least a tacky state, a degree of adhesion sufficient to satisfactorily anchor a subsequently applied condensation cure RTV, or when allowed to achieve a tack-free state, provide a cohesive failure value in accordance with ASTM D-4541.

There is also provided by the present invention, an epoxy-silicone-adhesive paint comprising an epoxy resin paint, and an effective amount of an aminoalkyltrialkoxysilane based on the weight of epoxy resin. There is also provided by the present invention, the substrate obtained by treating by the method hereinabove.

DETAILED DESCRIPTION OF THE INVENTION

The expression "silicone condensation cure RTV compositions" as used in the present invention, means liquid silicone mixtures, which are often manufactured as "two-part" mixtures. The expression "two-part silicone RTV" as used in the present invention means that liquid silicone mixtures, referred to sometimes as "part one" and "part two", can be converted from the liquid state to the elastomeric, or rubber state, when combined at room temperature.

In part one, there is generally employed a silanol-terminated polydiorganosiloxane, such as a silanol-terminated polydimethylsiloxane along with a filler, for example calcium carbonate. In part two, a curing agent, such as a metallic salt of a carboxylic acid, or metallic compound can be used. While tin oxide, for example, dibutyl tin oxide is preferred, other metallic compounds, such as salts of lead, zirconium, antimony, and manganese, in combination with acid radicals such as acetate, butyrate, octoate have been found effective. These compounds can be used with a partially condensed organosilicate, for example an alkylsilicate, such as an ethylsilicate. A more detailed description can be found in Griffith, U.S. Pat. No. 5,449,553, which is incorporated herein by reference.

In addition to the above described ingredients, the respective parts of the two-part silicone RTV often contain major amounts of organic solvents, such as hydrocarbon solvents, for example mineral spirits, to facilitate application of these paint-like materials.

The epoxy-silicone-adhesive paint is preferably made by thoroughly blending SCM501C, a silicone adhesive of GE Silicones, Waterford, N.Y., with a suitable epoxy resin paint, such as AMERLOCK 400 FD, of the Ameron Co. of Brea, Calif. After the various ingredients have been thoroughly mixed, the resulting mixture can be applied at thicknesses of 4–10 mils, and preferably 6–8 mils, such as by spraying, as a second coat onto the surface of an epoxy-coated steel substrate. Effective bonding of the silicone bonding layer onto the treated epoxy substrate can be achieved after evaporation of volatiles as long as a tacky condition of the epoxy-silicone-adhesive layer is maintained. This feature can allow adequate work time, such as up to 20 hours or more.

While the aminoalkyltrialkoxysilane used in the practice of the invention is preferably γ-aminopropyltrimethoxysilane, other aminoalkyltrialkoxysilanes can be used such as, $NH_2RSi(OR^1)_3$, where R is methylene, dimethylene, or $C_{(4-8)}$ alkylene, and $R^1$ is $C_{(2-8)}$ alkyl resin in the epoxy-silicone-adhesive paint.

In order that those skilled in the art will be better able to practice the present invention, the following examples are given by way of illustration, and not by way of limitation. All parts are by weight unless otherwise indicated.

EXAMPLE 1

An epoxy-silicone-adhesive paint is prepared by thoroughly mixing together AMERLOCK 400 FD epoxy resin paint of the Ameron Co. of Brea, Calif., and 15% by weight of a silicone adhesion promoter. The silicone adhesion promoter, SCM501C, is a product of GE Silicones, Waterford, N.Y., and consists essentially of 62% by weight of mineral spirits, 11.3% of partially condensed ethyl silicate, 3.8% of solubilized dibutyl tin oxide, and 22.5% of γ-aminopropyltrimethoxysilane. The resulting epoxy-silicone-adhesive paint is sprayed onto a 6 inch×6 inch epoxy resin coated steel test panel. There is obtained a steel panel having a dual epoxy coating, and a 6–8 mil second coat. The resulting painted panel is allowed to air cure to a tacky state after four hours under ambient conditions.

There is painted onto the dual epoxy-coated steel panel, a silicone-bonding RTV composition, Silgan J-501 of the Wacker Silicones Corporation. A coating is formed after three hours which shows excellent adhesion to the dual epoxy-coated steel panel.

EXAMPLE 2

A epoxy-silicone-adhesive paint is prepared in accordance with example 1, consisting of AMERLOCK 400 FD epoxy resin paint, and 15% by weight of the silicone adhesion promoter. The paint blend is sprayed onto a 6 inch×6 inch steel test panel which is initially coated with a cured epoxy resin paint. There is obtained a steel panel having a dual epoxy coating with a 6–8 mil second coat.

Steel adhesion dollies are imbedded into the surface of the second paint coating on the steel panel surface. After a four-day cure time, the adhesion dollies are pulled using hydraulic adhesion testing equipment. The adhesion measurements are obtained in accordance with ASTM D-4541 for portable adhesion, using HATE MARK 1V test equipment of KTA Company, Pittsburgh, Pa. It is found that cohesive failure occurs in the cured adhesion promoter mixture at 300–325 psi, where cohesive means that a breakdown in the topcoat wall occurs instead of separation between topcoat and tiecoat.

What is claimed is:

1. A method of modifying, under atmospheric conditions, a metallic substrate coated with a cured epoxy resin to allow the subsequent application thereon of a duplex silicone foul release coating, wherein the foul release coating comprises a condensation cure room temperature vulcanizable composition, the method comprising the step of, (a) applying onto the cured epoxy resin coated metallic substrate an epoxy-silicone-adhesive paint comprising by weight (i) 80–85% of an epoxy resin paint, and (ii) 15–20% of a silicone adhesive promoter, wherein the promoter comprises a volatile hydrocarbon solvent, a partially condensed organosilicate, a solubilized metallic catalyst, and an aminoalkyltrialkoxysilane, where the aminoalkyltrialkoxysilane is present in the silicone adhesive promoter in an amount which is at least sufficient to impart to the epoxy-silicone-adhesive paint, upon cure to at least a tacky state, a degree of adhesion sufficient to satisfactorily anchor a subsequently applied condensation cure room temperature vulcanizable composition (RTV), or when allowed to achieve a tack-free state, provide a cohesive failure value in accordance with ASTM D-4541.

2. A method in accordance with claim 1, where the aminoalkytrialkoxysilane is γ-aminopropyltrimethoxysilane.

3. A method in accordance with claim 1, where the organosilicate is an alkyl silicate.

4. A method in accordance with claim 1 of modifying under atmospheric conditions, a steel substrate coated with a cured epoxy resin to allow the subsequent application thereon of a duplex silicone foul release coating, where the silicone adhesive promoter comprises, mineral spirits, a partially condensed ethyl silicate, a solubilized dibutyl tin oxide, and an effective amount of γ-aminopropyltrimethoxysilane.

5. A method in accordance with claim 1, where the epoxy-silicone-adhesive paint is sprayed onto the surface of the cured epoxy resin coated metallic substrate.

6. A method in accordance with claim 1, where the silicone foul release coating is an organo-silicon condensation cure RTV bonding layer.

7. A method in accordance with claim 6, where a condensation cure silicone RTV is applied onto the organo-silicon condensation cure RTV bonding layer to form a duplex silicone foul release coating.

8. An environmentally safe method for coating a ship's hull with a duplex silicone foul release coating based on the employment of an epoxy-silicone-adhesive paint which is applied directly onto the surface of an anti-corrosive epoxy-coated steel substrate and subsequently coated with a duplex silicone foul release coating wherein the foul release coating comprises a condensation cure RTV.

9. A method of modifying, under atmospheric conditions, a ship's hull coated with a cured epoxy resin to allow the subsequent application thereon of a duplex silicone foul release coating, wherein the foul release coating comprises an organo-silicon condensation cure RTV, the method comprising the step of, (a) applying onto the cured epoxy resin coated ship's hull an epoxysilicone-adhesive paint comprising by weight (i) 80–85% of an epoxy resin paint, and (ii) 15–20% of a silicone adhesive promoter, wherein the promoter comprises mineral spirits, a partially condensed ethyl silicate, a solubilized dibutyl tin oxide, and a γ-aminopropyltrimethoxysilane, wherein the γ-aminopropyltrimethoxysilane is present in the silicone adhesive promoter in an amount which is at least sufficient to impart to the epoxysilicone-adhesive paint, upon cure to at least a tacky state, a degree of adhesion sufficient to satisfactorily anchor a subsequently applied organo-silicon condensation cure RTV, or when allowed to achieve a tack-free state, provide a cohesive failure value in accordance with ASTM D-4541.

* * * * *

UNITED STATES PATENT AND TRADEMARK OFFICE
CERTIFICATE OF CORRECTION

PATENT NO. : 6,110,536
DATED : August 29, 2000
INVENTOR(S) : Owen Maynard Harblin It is certified that error appears in the above-identified patent and that said Letters Patent is hereby corrected as shown below:

<u>Column 1,</u>
Lines 7-10, delete and replace it with the following:
-- This invention was made with Government support under Grand/Contract Number N00014-95-C-6024 awarded by the Department of the Navy. The Government has certain rights in the invention. --

Signed and Sealed this

Sixth Day of August, 2002

Attest:

Attesting Officer

JAMES E. ROGAN
Director of the United States Patent and Trademark Office